(12) United States Patent
Jolic

(10) Patent No.: US 9,266,377 B2
(45) Date of Patent: Feb. 23, 2016

(54) SECURITY ELEMENT AND METHOD OF PRODUCING A SECURITY ELEMENT

(71) Applicant: Innovia Security Pty Ltd, Craigieburn, Victoria (AU)

(72) Inventor: Karlo Ivan Jolic, Craigieburn (AU)

(73) Assignee: Innovia Security Pty Ltd, Craigieburn, Victoria (AU)

( * ) Notice: Subject to any disclaimer, the term of this patent is extended or adjusted under 35 U.S.C. 154(b) by 0 days.

(21) Appl. No.: 14/345,553

(22) PCT Filed: Sep. 17, 2012

(86) PCT No.: PCT/AU2012/001115
§ 371 (c)(1),
(2) Date: Mar. 18, 2014

(87) PCT Pub. No.: WO2013/040629
PCT Pub. Date: Mar. 28, 2013

(65) Prior Publication Data
US 2014/0376096 A1    Dec. 25, 2014

(30) Foreign Application Priority Data
Sep. 20, 2011    (AU) .................................. 2011101209

(51) Int. Cl.
*B42D 15/00* (2006.01)
*B42D 25/351* (2014.01)
*B41M 3/14* (2006.01)
*B42D 25/29* (2014.01)
*B42D 25/40* (2014.01)
*B41F 9/00* (2006.01)
*G02B 3/00* (2006.01)
*B41M 1/10* (2006.01)
*B41M 3/00* (2006.01)

(52) U.S. Cl.
CPC ................ *B42D 25/351* (2014.10); *B41F 9/00* (2013.01); *B41M 3/14* (2013.01); *B42D 25/29* (2014.10); *B42D 25/40* (2014.10); *G02B 3/0012* (2013.01); *B41M 1/10* (2013.01); *B41M 3/008* (2013.01); *B42D 2035/20* (2013.01); *B42D 2035/44* (2013.01)

(58) Field of Classification Search
CPC .............................. B41M 3/14; G03G 21/043
USPC .............................................. 359/619; 283/72
See application file for complete search history.

(56) References Cited

U.S. PATENT DOCUMENTS

| 6,506,478 | B1 | 1/2003 | Schulz | |
| 6,637,327 | B2 | 10/2003 | Endo et al. | |
| 7,654,581 | B2 * | 2/2010 | Cruikshank et al. | 283/89 |
| 2008/0037131 | A1 * | 2/2008 | Steenblik et al. | 359/619 |

OTHER PUBLICATIONS

International Search Report and Written Opinion for Application No. PCT/AU2012/001115 dated Nov. 27, 2012.

* cited by examiner

*Primary Examiner* — William Choi
(74) *Attorney, Agent, or Firm* — Alston & Bird LLP

(57) ABSTRACT

A security element and a method of printing a security element using a rotary printing process, the security element including a plurality of image elements, the method including: providing a transparent or translucent substrate having a printing side; and printing an image layer onto at least a portion of the printing side of the substrate, wherein the image layer is contiguous and includes an extended edge region and an image region, wherein at least a portion of the extended edge region is printed before the image region, and wherein the image region includes unprinted and printed areas.

20 Claims, 6 Drawing Sheets

SECURITY ELEMENT AND METHOD OF PRODUCING A SECURITY ELEMENT

FIELD OF THE INVENTION

The invention generally relates to rotary printed security elements and methods for printing such elements.

BACKGROUND

It is known to provide optically variable devices in which arrays of microlenses focus on an object surface containing multiple sets of interleaved image elements. Each set of image elements belongs to a distinct image, so that, as a user viewing the device changes their relative angle of view, a different image becomes visible.

Image elements may be printed onto the object surface using a rotary printing process, for example gravure printing or offset printing. However, the initial portions of the image elements printed may suffer from a distortion known as feathering. This is particularly applicable to gravure printing processes.

It is desirable to produce image elements with reduced distortion due to feathering.

Security Document

As used herein, the term security document includes all types of documents and tokens of value and identification documents including, but not limited to, the following: items of currency such as banknotes and coins, credit cards, cheques, passports, identity cards, securities and share certificates, driver's licences, deeds of title, travel documents such as airline and train tickets, entrance cards and tickets, birth, death and marriage certificates, and academic transcripts.

Transparent Windows and Half Windows

As used herein the term window refers to a transparent or translucent area in the security document compared to the substantially opaque region to which printing is applied. The window may be fully transparent so that it allows the transmission of light substantially unaffected, or it may be partly transparent or translucent partially allowing the transmission of light but without allowing objects to be seen clearly through the window area.

A window area may be formed in a polymeric security document which has at least one layer of transparent polymeric material and one or more opacifying layers applied to at least one side of a transparent polymeric substrate, by omitting least one opacifying layer in the region forming the window area. If opacifying layers are applied to both sides of a transparent substrate a fully transparent window may be formed by omitting the opacifying layers on both sides of the transparent substrate in the window area.

A partly transparent or translucent area, hereinafter referred to as a "half-window", may be formed in a polymeric security document which has opacifying layers on both sides by omitting the opacifying layers on one side only of the security document in the window area so that the "half-window" is not fully transparent, but allows some light to pass through without allowing objects to be viewed clearly through the half-window.

Alternatively, it is possible for the substrates to be formed from an substantially opaque material, such as paper or fibrous material, with an insert of transparent plastics material inserted into a cut-out, or recess in the paper or fibrous substrate to form a transparent window or a translucent half-window area.

Opacifying Layers

One or more opacifying layers may be applied to a transparent substrate to increase the opacity of the security document. An opacifying layer is such that $L_T < L_0$, where $L_0$ is the amount of light incident on the document, and $L_T$ is the amount of light transmitted through the document. An opacifying layer may comprise any one or more of a variety of opacifying coatings. For example, the opacifying coatings may comprise a pigment, such as titanium dioxide, dispersed within a binder or carrier of heat-activated cross-linkable polymeric material. Alternatively, a substrate of transparent plastic material could be sandwiched between opacifying layers of paper or other partially or substantially opaque material to which indicia may be subsequently printed or otherwise applied.

SUMMARY OF THE INVENTION

According to a first aspect of the present invention, there is provided a method of printing a security element using a rotary printing process which is susceptible to feathering, the security element including a plurality of image elements, the method including:

a) providing a transparent or translucent substrate having a printing side; and
b) printing an image layer onto at least a portion of the printing side of the substrate,
wherein the image layer includes an extended edge region and an image region, the image region including the plurality of image elements, wherein at least a portion of the extended edge region is printed before the image region.

Feathering is a distortion found in some rotary printing processes, such as gravure printing, that can result from a number of factors. For example, some of the ink on the printing drum drying more than expected before it is applied to a printing surface (for example, a paper surface or a substrate). In another example, feathering can be caused by the indentations intended to fill with ink, such as gravure cells, on the leading edge (the edge first printed to the printing surface) of an image to be applied to the printing surface not filling with ink as expected. Another possible cause is the indentations on the leading edge not transferring the ink contained within the cells to the printing surface as expected. Again, this can be an issue with gravure cells during gravure printing. In general, any distortion that results in an edge of the image that appears ragged or feathered, and therefore less well defined than expected, may be described as a feathering effect. The feathering effect is usually associated with the leading edge of the image.

The plurality of image elements may correspond to printed areas. Alternatively, the plurality of image elements may correspond to unprinted areas.

Preferably, during printing, a feathering effect is substantially confined to the extended region. Alternatively, during printing, a feathering effect is completely confined to the extended region. The extended edge region may define a border surrounding the image region.

Preferably, the extended edge region covers substantially the entire printing surface of the printing side of the substrate. The extended edge region may include one or more windows, corresponding to regions of unprinted areas distinct from the image region. At least one window may contain a further security feature.

Preferably, the image layer corresponds to a layer of ink applied during the printing process. The image layer may be substantially opaque.

Preferably, there is included a further step of applying a patch layer to the printing side, such that at least a portion of an image layer is between the patch layer and the substrate. Alternatively, the patch layer can be applied to the printing side such that at least a portion of the patch layer is between an image layer and the printing side.

The patch layer may at least partially cover the image elements. Alternatively, the patch layer may completely cover the image elements. The patch layer may be of a darker hue or shade when compared to the image layer. Alternatively, the patch layer may be of a lighter hue or shade when compared to the image layer.

Preferably, the patch layer corresponds to a layer of ink applied during the printing process. The patch layer may be substantially transparent or translucent. Alternatively the patch layer may be substantially opaque.

Preferably, there are two or more image layers printed onto a printing side of the substrate. Each image layer may at least partially overlap another image layer. Preferably, there are two or more patch layers applied onto the printing side of the substrate. Preferably, there is one unique patch layer for each image layer. Preferably, the substrate includes two printing sides, and there is one or more image layers applied to each printing side.

Preferably, the substrate includes a viewing side and the method includes a further step of forming a plurality of focussing elements in or on the viewing side of the substrate. The focussing elements may be microlenses. The focussing elements may have a focal length substantially equal to the thickness of the substrate. Alternatively, the focussing elements may have a focal length longer than the thickness of the substrate. Preferably, the focussing elements are configured for viewing the image elements.

Preferably, the viewing side is opposite the printing side.

Preferably, there is included a further step of applying a design layer to either one or both of the viewing surface and the printing surface.

The rotary printing process may be a gravure printing process. Alternatively, the rotary printing process may be an offset printing process.

Preferably, the printing side of the substrate has substantially the same surface area as the image layer. Alternatively, the printing side of the substrate may have a larger surface area than the image layer.

In a second aspect of the present invention, there is provided a security element produced by a rotary printing process which is susceptible to feathering, including:
a) a transparent or translucent substrate having a printing side and a viewing side; and
b) an image layer on top of the printing side of the substrate, wherein the image layer includes an extended edge region and an image region, the image region including the plurality of image elements, wherein at least a portion of the extended edge region is printed before the image region.

The plurality of image elements may correspond to printed areas. Alternatively, the plurality of image elements may correspond to unprinted areas.

Preferably, the extended region is configured such that a feathering effect resulting from the printing of the image layer to the printing side of the substrate is substantially confined to the extended region.

Preferably, the extended region is configured such that a feathering effect resulting from the printing of the image layer to the printing side of the substrate is completely confined to the extended region.

Preferably, the extended edge region defines a border surrounding the image region. The extended edge region may cover substantially the entire printing surface of the printing side of the substrate. The extended edge region may include one or more windows, corresponding to regions of unprinted areas distinct from the image region. Preferably, at least one window contains a further security feature.

Preferably, the image layer corresponds to a layer of ink applied during the printing process. The image layer may be substantially opaque.

Preferably, there are two or more image layers printed onto a printing side of the substrate. Each image layer may at least partially overlap another image layer. Preferably, there are two or more patch layers applied onto the printing side of the substrate. There may be one unique patch layer for each image layer.

Preferably, the substrate includes two printing sides, and there is one or more image layers applied to each printing side.

Preferably, there is included a patch layer, such that at least a portion of an image layer is between the patch layer and the substrate. Alternatively, there is included a patch layer, such that at least a portion of the patch layer is between an image layer and the substrate. The patch layer may at least partially cover the image elements. The patch layer may alternatively completely cover the image elements.

Preferably, the patch layer is of a darker hue or shade when compared to the image layer. Alternatively, the patch layer may be of a lighter hue or shade when compared to the image layer. The patch layer may correspond to a layer of ink applied during the printing process.

Preferably, the patch layer is substantially transparent or translucent. Alternatively, the patch layer may be substantially opaque.

Preferably, there are two or more image layers printed onto a printing side of the substrate. Each image layer may at least partially overlap another image layer. Preferably, there are two or more patch layers applied onto the printing side of the substrate. Preferably, there is one unique patch layer for each image layer. Preferably, the substrate includes two printing sides, and there is one or more image layers applied to each printing side.

Preferably, the substrate includes a viewing side, and the security element further includes a plurality of focussing elements in or on the viewing side of the substrate. The focussing elements may be microlenses. Preferably, the focussing elements have a focal length substantially equal to the thickness of the substrate. Alternatively, the focussing elements may have a focal length longer than the thickness of the substrate. Preferably, the focussing elements are configured for viewing the image elements.

Preferably, there is included a design layer on either or both of the viewing surface and the printing surface. Preferably the printing process is a gravure printing process.

According to a third aspect of the present invention, there is provided a security document including a security element produced according to the method of the first aspect of the invention. The security document is, preferably, a value document such as a bank note, cheque or share certificate.

According to a fourth aspect of the present invention, there is provided a security document including a security element as per the second aspect of the invention.

Preferably, there is included one or more secondary security elements. The one or more secondary security elements may be selected from: an area of microprinting; a security thread; a hologram; and a self verification window.

BRIEF DESCRIPTION OF THE DRAWINGS

Preferred embodiments of the invention will now be described with reference to the accompanying drawings in which:

Referring to FIG. 1, a security document 100 is shown including a security element 101 and an optional secondary security element 102. The security element 101 can be constructed as a separate element to the security document, allowing it to be applied to the security document 100, or other security articles.

Figure 2:
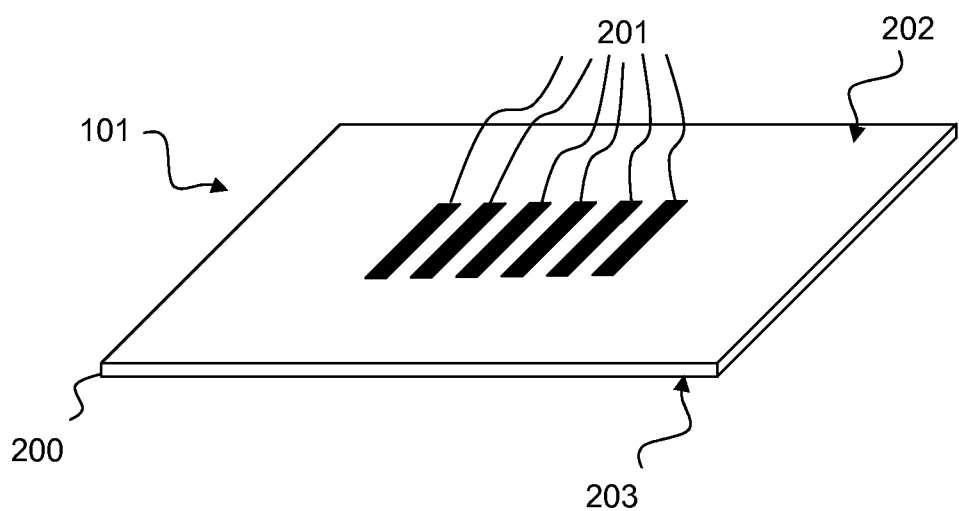
FIG. 2 shows a security element according to one embodiment.

The security element 101, as shown in FIG. 2, includes a viewing side 202 and a printing side 203. The viewing side 202 is arranged such that the printing side 203 is viewable through the substrate 200 from the viewing side 202. For example, an opacifying layer can be applied to the viewing side except in the area of interest to create a window or half-window on the security element 101. In one embodiment, image elements 201 are viewable from only the viewing side 202, however, in general the image elements 201 can be viewable from either one or both sides 202, 203. Each image element 201 can correspond to part of one or more images. The image elements 201 can be opaque, translucent, or transparent. In one embodiment, each image element 201 is coloured, and the colour of each image element 201 is selected from a range of colours.

Figure 3:
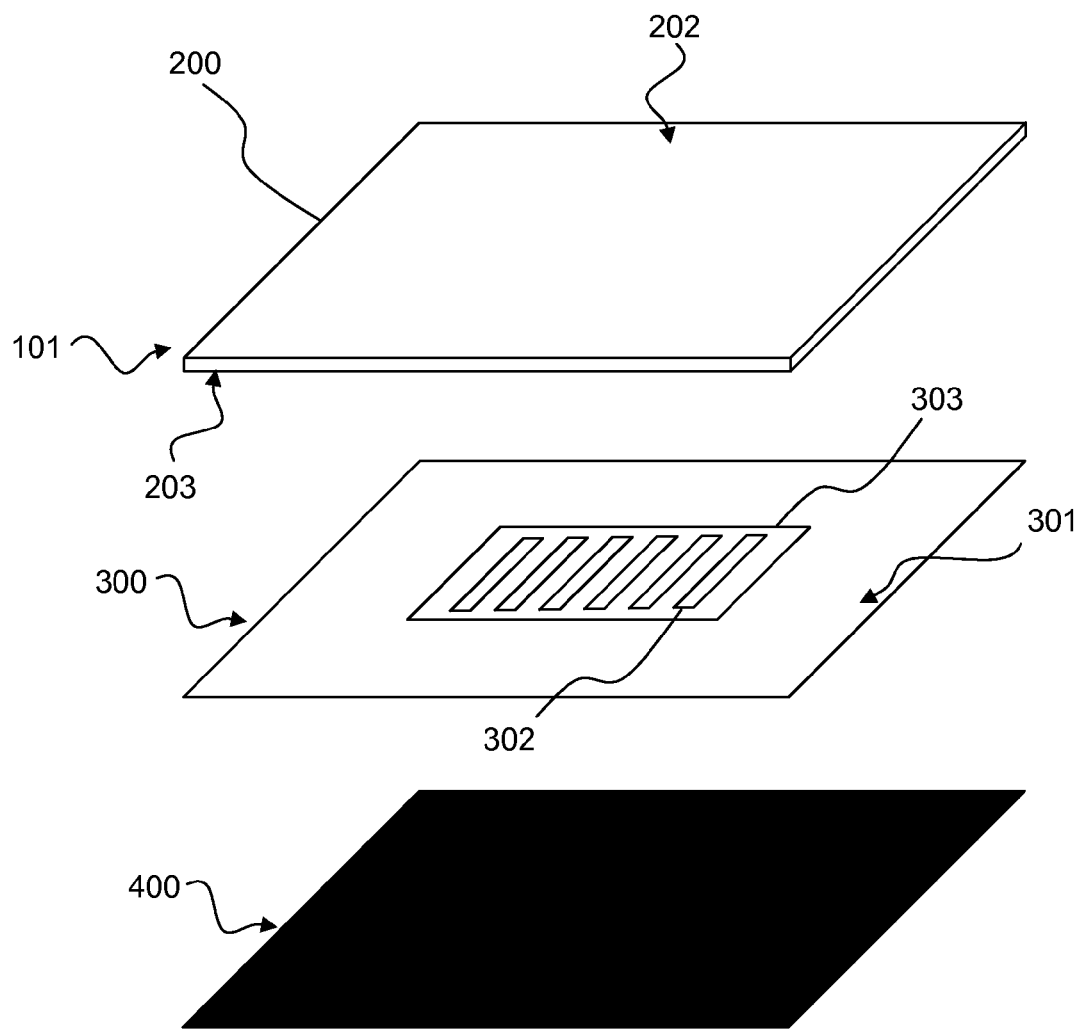
FIG. 3 shows an exploded view of a security element, including a substrate layer, an image layer and a patch layer.

FIG. 3 shows an exploded view of the security element 101, including an image layer 300, the substrate 200, and an optional patch layer 400. The image layer 300 is an ink layer applied to the printing side 203 of the substrate 200 using a rotary printing process, for example gravure printing or offset printing. The image layer 300 includes an extended edge region 301 and an image region 303. Image region 303 in FIG. 3 is part of the image layer 300. Therefore, when the image layer 300 is printed, image region 303 and extended edge region 301 are printed in the same printing process. That is, image region 303 and extended edge region 301 are not separate layers laid down in separate printing processes.

The extended edge region 301 defines an area of the image layer surrounding the image region 303. The extended edge region 301 is large enough such that, during printing, any feathering effect, is confined to, or at least substantially confined to, the extended region 301. This allows for higher definition of the image elements 201 during printing, as the feathering effect is minimised or removed from the image region 303.

The image region 303 includes image element regions 302 corresponding to the image elements 201 of the security element 101. The image element regions 302 can either correspond to regions of the image region 303 which are absent of ink or contain ink, depending on the particular embodiment. The areas of the image region 303 not corresponding to image element regions 302 correspondingly contain ink or are absent of ink, such that the image elements 201 are defined within the image region.

In one embodiment, after application of the image layer 300 to the printing side of the substrate 200, an optional patch layer 400 is applied to the substrate 200, such that the image layer 300 is located between the substrate 200 and the patch layer 400. The patch layer 400 can be applied using the same rotary printing technique as used to apply the image layer 300, or alternatively any other technique suitable for applying a layer onto the image layer 300. The patch layer 400 may cover the entire printing surface 203 of the substrate 200, or alternatively only a portion of the printing surface 203. Furthermore, the patch layer 400 can cover the entirety of each image element region 302, or alternatively the patch layer may cover a portion of each image element region 302.

The patch layer 400 preferably contrasts with the image layer 300. The patch layer 400 can be a darker shade or colour when compared to the image layer 300. For example, the image layer 300 may be white and the patch layer 400 may be black. Alternatively, the patch layer 400 can be a lighter shade or colour when compared to the image layer 300. The patch layer 400 can be opaque, translucent or transparent. The patch layer 400 can be of substantially one colour or can include a range of colours and/or varying levels of transparency/opaqueness. If the patch layer 400 is opaque, then the image elements 201 are only visible from the viewing side 202 of the security element 101. Alternatively, if the patch layer is translucent or transparent, the image elements 201 can be visible from both the viewing side 202 and the printing side 203.

In an alternative embodiment, the patch layer 400 is applied to the substrate 200 before the image layer 300.

Figure 4:
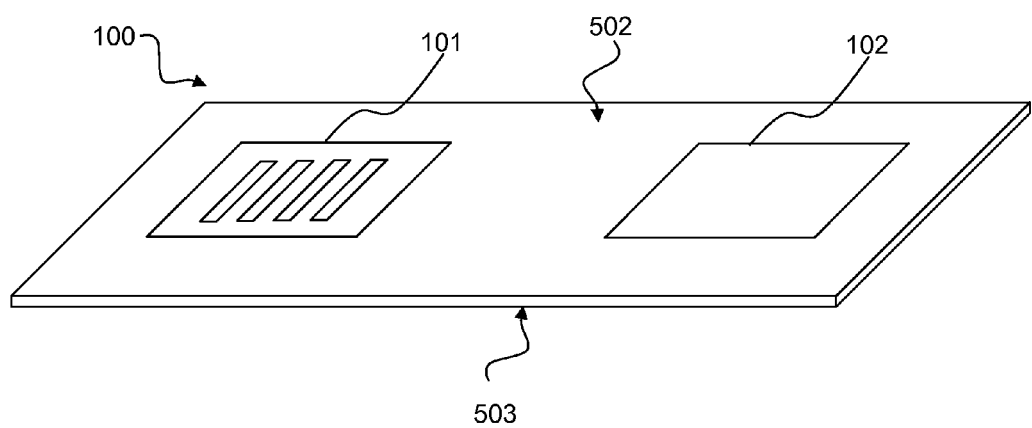
FIG. 4 shows a security document according to a further embodiment.
Figure 5:
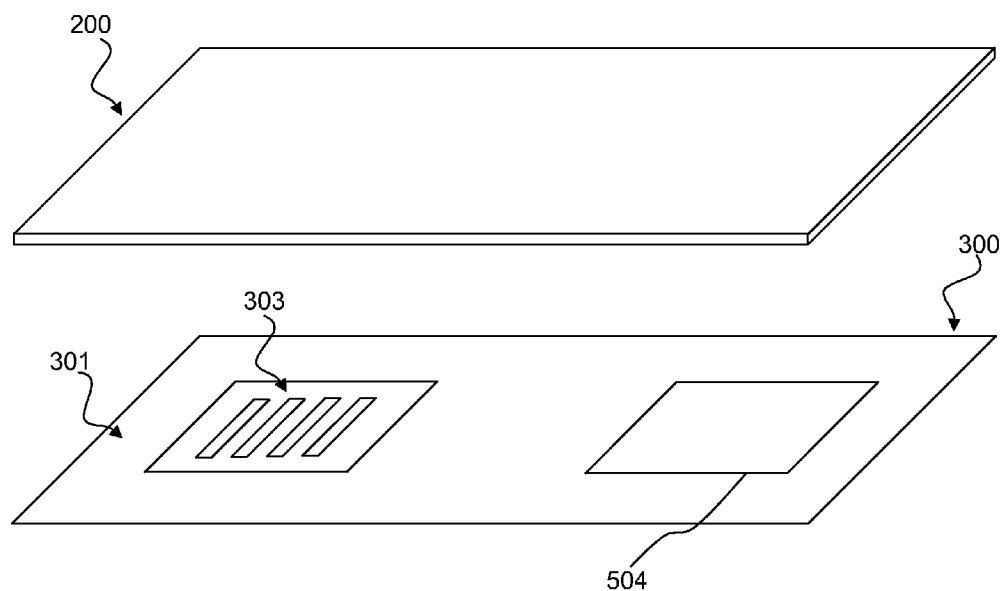
FIG. 5 shows an exploded view of a security document, including a substrate layer, an image layer including image elements and a window.

In one embodiment as shown in FIGS. 4 and 5, the security element 101 is integral to the security document 100. In this case, the extended edge region 301 of the image layer 300 covers all or substantially all of a surface of the security document 100 (i.e. the security document is defined as having a viewing side 502 and a printing side 503, and the image layer 300 is applied to the printing side 503 in a similar way as the security element 101). A window 102 can be included in the security document 100, in which case the image layer 300 includes a window element 504 defined as being absent ink. The window 102 may include further security features. There can be any number of windows 102 included in the security document 100.

Figure 1:
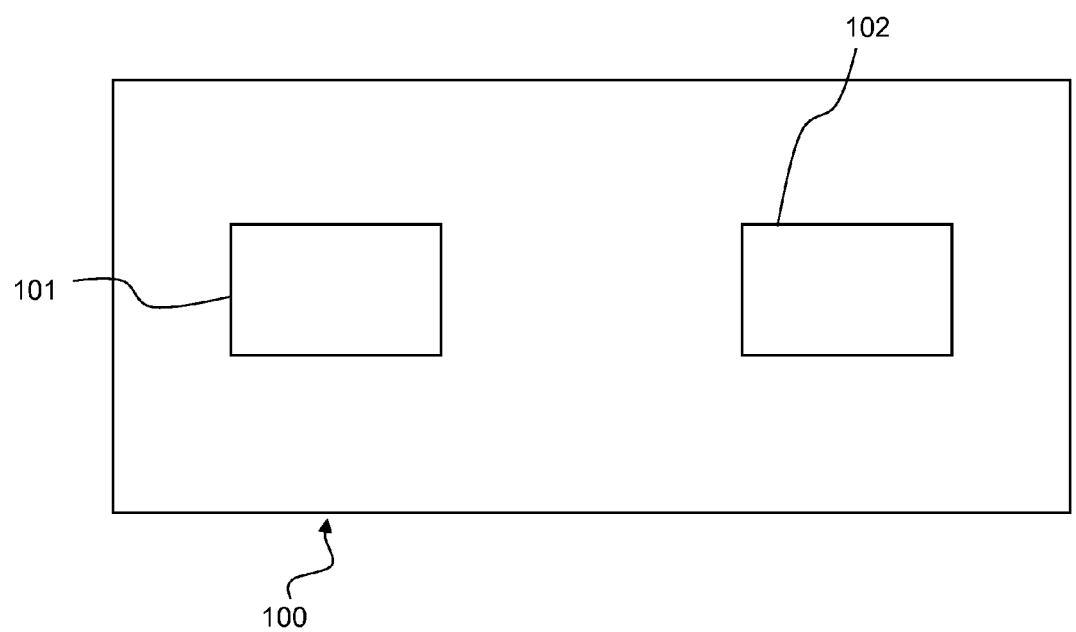
FIG. 1 shows a security document including a security element.

In this embodiment, the security element 102 region of the security document 100 is produced in a similar manner to the embodiment described in reference to FIGS. 1 to 3.

One advantage of the present embodiment is that it avoids the possibility of the security element 102 being visibly different to the rest of the security document 100, for example the security element 102 will not appear to be a subsection of the security document 100 due to, for example, the image layer or patch layer blocking more light in transmission than the rest of the document.

Figure 6:
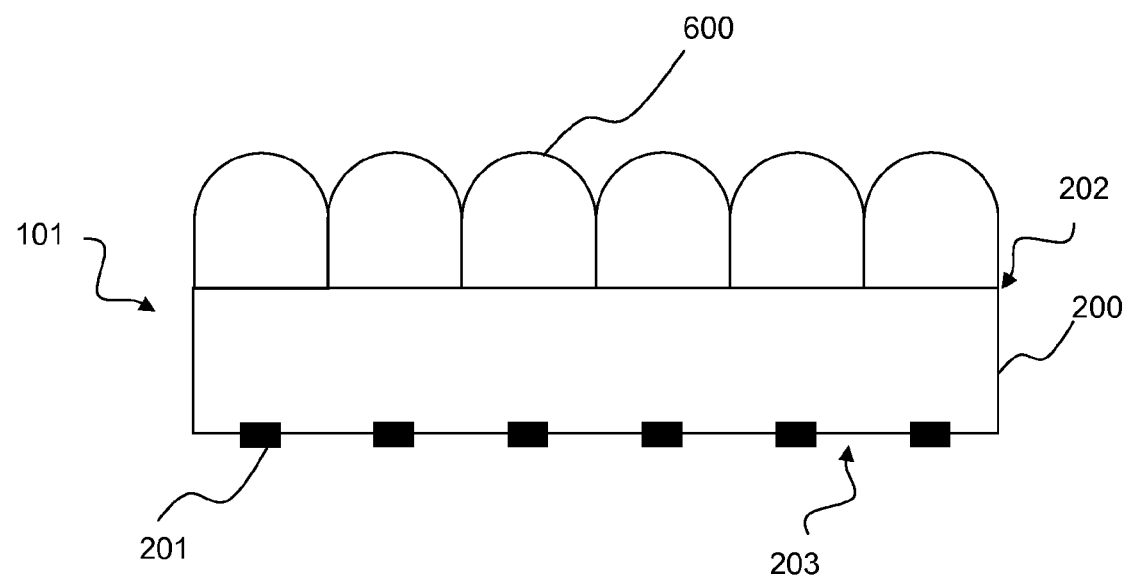
FIG. 6 shows a security element including focusing elements according to a further embodiment.

In one embodiment, as shown in FIG. 6, the viewing surface 202 includes a plurality of focusing elements 600. The focusing elements 600 can be microlenses. The focusing elements 600 can be formed from the substrate 200, or alternatively they can be applied to, or formed on, the viewing surface 202. The focusing elements 600 can be configured with a focal length the same as, or substantially the same as, the depth of the substrate 200. Alternatively the focal length can be longer or shorter than the thickness of the substrate 200.

Referring back to FIG. 1 or FIG. 4, if present, the secondary security element 102 can be of any appropriate type, for example one or more of: an area of microprinting; a security thread; a hologram; an optically variable device; and a self verification window. Alternatively the secondary security element 102 can be a transparent or translucent window.

In a further embodiment, more than one image layer 300 is applied to the substrate 200. Each image layer 300 can partially or completely overlap one or more other image layers 300, or alternatively each image layer 300 is applied to a distinct portion of the substrate 200. In this embodiment, there can be a patch layer 400 applied before or after each individual image layer 300, or alternatively a patch layer can be applied to two or more image layers 300.

Further modifications and improvements may be made without departing from the scope of the present invention. In another example modification, the image elements may only be visible from the printing side of the security element due to the application of an opaque layer to the viewing side.

The claims defining the invention are as follows:

1. A method of printing a security element using a rotary printing process which is susceptible to feathering, the security element including a plurality of image elements, the method including:
   a) providing a transparent or translucent substrate having a printing side; and
   b) printing an image layer onto at least a portion of the printing side of the substrate,
   wherein the image layer includes an extended edge region and an image region, the image region including the plurality of image elements, wherein at least a portion of the extended edge region is printed before the image region.

2. A method as claimed in claim 1, wherein the plurality of image elements correspond to printed areas or unprinted areas.

3. A method as claimed in claim 1, wherein during printing a feathering effect is completely or, at least, substantially confined to the extended region.

4. A method as claimed in claim 1, wherein the extended edge region defines a border surrounding the image region.

5. A method as claimed in claim 1, wherein the extended edge region covers substantially the entire printing surface of the printing side of the substrate.

6. A method as claimed in claim 1, including a further step of applying a patch layer to the printing side, such that at least a portion of the image layer is between the patch layer and the substrate.

7. A method as claimed in claim 6, wherein the patch layer at least partially covers the image elements.

8. A method as claimed in claim 7, wherein the patch layer corresponds to a layer of ink applied during the printing process.

9. A method as claimed in claim 1, wherein the substrate includes a viewing side, opposite the printing side, and wherein the method includes the further step of forming a plurality of focusing elements in or on the viewing side of the substrate for viewing the image elements.

10. A method as claimed in claim 1, wherein the rotary printing process is a gravure printing process.

11. A security element produced by a rotary printing process which is susceptible to feathering, including:
   a transparent or translucent substrate having a printing side and a viewing side; and
   an image layer on top of the printing side of the substrate, wherein the image layer includes an extended edge region and an image region, the image region including the plurality of image elements, wherein at least a portion of the extended edge region is printed before the image region and further including a patch layer, such that at least a portion of the image layer is between the patch layer and the substrate.

12. A security element as claimed in claim 11, wherein the plurality of image elements correspond to printed areas or unprinted areas.

13. A security element as claimed in claim 11, wherein the extended region is configured such that a feathering effect resulting from the printing of the image layer to the printing side of the substrate is completely or, at least, substantially confined to the extended region.

14. A security element as claimed in claim 11, wherein the extended edge region defines a border surrounding the image region.

15. A security element as claimed in claim 11, wherein the extended edge region covers substantially the entire printing surface of the printing side of the substrate.

16. A security element as claimed in claim 11, wherein the patch layer at least partially covers the image elements.

17. A security element as claimed in claim 11, wherein the patch layer corresponds to a layer of ink applied during the printing process.

18. A security element as claimed in claim 11, wherein the substrate includes the viewing side, opposite the printing side, and the security element further includes a plurality of focusing elements in or on the viewing side of the substrate.

19. A security element as claimed in claim 11, wherein the rotary printing process is a gravure printing process.

20. A security document including a security element in accordance with claim 11.

* * * * *